Patented Mar. 23, 1954

2,673,203

UNITED STATES PATENT OFFICE 2,673,203

PREPARATION OF DECAHYDRODIPYRROLO-
(a,d)-PYRAZINE

Edward Segel, Chicago, Ill., assignor to Corn
Products Refining Company, New York, N. Y.,
a corporation of New Jersey No Drawing. Application October 27, 1951,
Serial No. 253,570

5 Claims.  (Cl. 260—250)

This invention relates to a novel chemical compound, decahydrodipyrrolo-(a,d)-pyrazine, a hitherto unknown derivative of piperazine. This invention also relates to novel methods for the preparation of this compound, particularly from glutamic acid and derivatives thereof. The novel compound of this invention is a completely saturated ditertiary amine containing two five-membered rings fused to a six-membered ring, each nitrogen atom being common to both a five-membered and the six-membered ring. I believe my compound has the following structural formula:

(I) 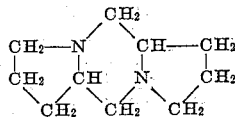

which has been confirmed by its titration curve, neutral equivalent, and elemental analysis. This new compound is a white, crystalline solid, melting at 84.0 to 84.5° C. Its solubility is quite unusual, being very soluble at room temperature in such diverse solvents as water, acetone, hexane, and benzene. In solution it behaves as an organic base. Quaternary ammonium salts derived from it may find use as surface-active agents or bactericides. It is also effective in removing acids during organic reactions, and may serve as a solvent (above its melting point) for such processes as Grignard reactions. Further, this compound has been found to effectively inhibit corrosion of mild steel, copper, and aluminum in gasoline.

Suitable starting materials for the preparation of the new compound of this invention according to my novel process are those compounds having the following structure or which can be readily transformed to compounds having such structure:

(II) 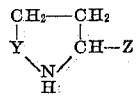

wherein Y represents a carbonyl (>C=O) or methylene (>CH$_2$) group and Z an ester group, such as —COOC$_2$H$_5$, or a hydroxymethyl group (—CH$_2$OH). The cyclization of this class of compounds has been unknown heretofore.

Examples of suitable starting materials for the preparation of my novel compound, decahydrodipyrrolo-(a,d)-pyrazine, include butyl pyroglutamate,

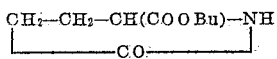

5-hydroxymethyl-2-pyrrolidone,

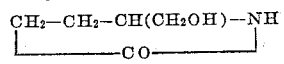

the ethyl ester of proline,

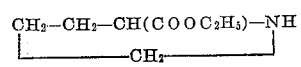

and substances which are readily converted into such compounds. For example, dibutyl glutamate, which is rapidly converted to butyl pyroglutamate upon heating under the conditions described below, is also a satisfactory starting material for the preparation of the novel compound of this invention.

The above-described ring system of my novel Compound I is not present in any of the compounds from which it may be prepared, but is formed therefrom by cyclization during hydrogenation. Reductive cyclization of an amido ester, which is the type of reaction here involved, was unknown heretofore. For example, the only product previously reported to have been obtained from the hydrogenation of the α-amido ester, ethyl pyroglutamate, is 5-hydroxymethyl-2-pyrrolidone, the amido group not entering into the reaction.

The novel process of this invention for the preparation of decahydrodipyrrolo-(a,d)-pyrazine comprises cyclization and hydrogenation of compounds containing the ring structure of (II) above or compounds readily converted into compounds having such ring structure. Hydrogenation and cyclization is effected by heating the starting material, dissolved in an inert solvent such as dioxane, in the presence of hydrogen and a hydrogenation catalyst, e. g. copper-chromium oxide, commonly denoted copper chromite.

The temperature required lies within the range of approximately 200° to approximately 275° C., the preferred temperature being approximately 250° C. The hydrogen pressure used is not critical but, advantageously, it is about 2000 p. s. i. throughout the reaction period. Hydrogen pressures within the range of about 1900 to 3000 p. s. i. are preferred, although higher or lower pressures may be used, if desired. The time of reaction is not critical; it depends to some extent upon the reactant and the conditions employed. The period required for completion of the reaction may vary from about one to about twenty-four hours; however, a reaction period exceeding that required for completion is not harmful. The rate of reaction increases with increasing amounts of catalyst. In general, however, amounts of catalyst within the range of about 30 to about 50 per cent by weight of the reactant are satisfactory.

Although any inert solvent may be used in the process of this invention, dioxane is preferred.

The reaction may appropriately be carried out in a metal vessel designed to withstand high pressure. The course of hydrogen absorption may be followed by the drop in pressure. It has been found that the time necessary to reduce a peptide linkage is sufficient to effect cyclization.

When the compound used in the practice of the process of this invention is an ester, somewhat lower yields of decahydrodipyrrolo-(a,d)-pyrazine are obtained unless the hydrogenation procedure is modified slightly. This is due to the fact that hydrogenation of an ester generates two alcohols:

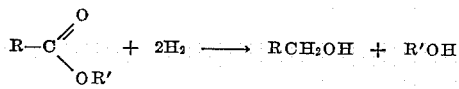

The two alcohols then compete as alkylating agents if an amino nitrogen atom is present, and, therefore, compounds in addition to the desired one are formed.

Such undesirable side reactions can be avoided by a two-stage hydrogenation process. The first stage is carried out at a comparatively low temperature, for example about 150° C., at which temperature the ester group is substantially completely reduced, but little alkylation or cyclization takes place. The undesirable alcohol formed during the reaction may then be removed from the desired alcohol; e. g. if an ethyl ester was used, the ethyl alcohol formed may be distilled off. To accomplish this, it may be necessary to completely remove the solvent, or if the alcohol boils at a lower temperature than the solvent, it alone may be removed by appropriate fractionation techniques.

Further reaction of the desired alcohol in the presence of hydrogen is then effected, fresh solvent being added if necessary. The temperature of the second stage is then advantageously maintained within the range of about 200° to about 275° C., preferably at about 250° C. Since the undesired alcohol has been removed, it is obvious that side reactions due to its alkylating action cannot occur, and improved yields of decahydrodipyrrolo-(a,d)-pyrazine are obtained.

In any case, i. e. whether the hydrogenation and cyclization have been carried out in one or two stages, upon completion of the reaction, the catalyst is removed from the reaction mixture by any suitable means (e. g. filtration), the solvent is distilled off, and the product crystallized from the residue. The crude decahydrodipyrrolo-(a,d)-pyrazine may be purified by recrystallization from hexane or other suitable solvent.

The amino acid, glutamic acid, is a readily available chemical and may serve as the basic raw material for the production of decahydrodipyrrolo-(a,d)-pyrazine, since it is conveniently converted into compounds such as dibutyl glutamate, butyl pyroglutamate, or 5-hydroxymethyl-2-pyrrolidone. Similarly, proline, another amino acid, may likewise be considered a basic starting material for the preparation of the novel compound of this invention, as it may readily be esterified to give an ester containing the five-membered ring system shown in (II) above.

The following examples of the preparation of the novel compound of this invention are informative and typical only and not intended in a limiting sense; however, they serve to illustrate more fully the process of this invention:

Example 1

A stainless steel Parr bomb of 480 ml. capacity, fitted with pressure gauge and thermocouple, was charged with 37.0 g. butyl pyroglutamate, 18.5 g. copper chromite, and 150 ml. dioxane. Hydrogen was introduced to a pressure of 2000 p. s. i., and the temperature was raised to 250° C. The reaction vessel was rocked to keep the contents agitated. After 5½ hours, the reaction vessel was cooled and opened, and the contents of the bomb filtered. The filtrate was distilled in vacuo, taking off all material distilling below 40° C. The residue was kept in a refrigerator overnight, and then filtered. The white crystalline solid weighed 4.5 g., M. P. 69–77°. After recrystallization from hexane, the solid melted at 84.0–84.5°.

Example 2

The same reaction vessel was charged with 37.0 g. butyl pyroglutamate, 18.5 g. copper chromite, and 150 ml. dioxane, and brought to a hydrogen pressure of 1950 p. s. i. Reaction temperature was maintained at 150° C. for 4 hours. The contents were cooled and filtered. The solvent was distilled off in vacuo to a boiling point of 40° C., and the residue put back into the bomb together with 21.1 g. copper chromite and 150 ml. dioxane. Again hydrogen was introduced to a pressure of 1950 p. s. i., and reaction temperature was maintained at 250° C. for 5½ hours. Filtering and distilling off the solvent left a white, crystalline solid, M. P. 77–80°, weighing 12.3 g. After recrystallization from hexane, the solid melted at 84.0–84.5°.

Example 3

The same reaction vessel was charged with 1.4 g. 5-hydroxymethyl-2-pyrrolidone, 0.7 g. copper chromite, and 25 ml. dioxane, and brought to a hydrogen pressure of 1850 p. s. i. Reaction temperature was maintained at 250° C. for 5½ hours. The contents were cooled and filtered, and the solvent distilled off in vacuo. The residue quickly crystallized; weight 1.0 g., M. P. 81.2°. Recrystallization from hexane raised the M. P. to 84–84.5°.

I claim:
1. Decahydrodipyrrolo-(a,d)-pyrazine.
2. Process for the preparation of decahydrodipyrrolo-(a,d)-pyrazine, which comprises reacting butyl pyroglutamate with hydrogen under a pressure of about 1900 to about 3000 p. s. i., at a temperature within the range of about 200° to about 275° C., in the presence of an inert solvent and a copper-chromium oxide catalyst, until hydrogen is no longer absorbed.
3. Process for the preparation of decahydrodipyrrolo-(a,d)-pyrazine, which comprises reacting 5-hydroxymethyl-2-pyrrolidone with hydrogen under a pressure of about 1900 to about 3000 p. s. i., at a temperature within the range of about 200° C. to about 275° C., in the presence of an inert solvent and a copper-chromium oxide catalyst, until hydrogen is no longer absorbed.
4. Process for the preparation of decahydrodipyrrolo-(a,d)-pyrazine, which comprises reacting butyl pyroglutamate with hydrogen under a pressure of about 1900 to about 3000 p. s. i., in the presence of an inert solvent and a copper- chromite catalyst, at a temperature of approximately 150° C. for about four hours; distilling off the butyl alcohol liberated; further reacting the distillation residue with hydrogen under pressure of about 1900 to about 3000 p. s. i., at a temperature of about 250° C., in the presence of a copper chromite catalyst and an inert solvent, until hydrogen is no longer absorbed.

5. Process for the preparation of decahydrodipyrrolo-(a,d)-pyrazine, which comprises reacting the ethyl ester of proline with hydrogen under a pressure of about 1900 to about 3000 p. s. i., in the presence of an inert solvent and a copper-chromite catalyst, at a temperature of approximately 150° C. for about four hours; distilling off the ethyl alcohol liberated; further reacting the distillation residue with hydrogen under pressure of about 1900 to about 3000 p. s. i., at a temperature of about 250° C., in the presence of a copper chromite catalyst and an inert solvent, until hydrogen is no longer absorbed.

EDWARD SEGEL.

No references cited.